(No Model.)

G. T. CHAPMAN.
HOOF TOE CONTRACTOR AND SIDE EXPANDER.

No. 421,672. Patented Feb. 18, 1890.

WITNESSES.
E. B. Bolton
W. J. Morgan

INVENTOR:
Geo. T. Chapman
By A. P. Thayer,
his Attorney.

UNITED STATES PATENT OFFICE.

GEORGE T. CHAPMAN, OF WHITE PLAINS, ASSIGNOR OF ONE-HALF TO WILLIAM HARVEY MERRITT, OF NEW YORK, N. Y.

HOOF-TOE CONTRACTOR AND SIDE-EXPANDER.

SPECIFICATION forming part of Letters Patent No. 421,672, dated February 18, 1890.

Application filed May 1, 1889. Serial No. 309,147. (No model.)

*To all whom it may concern:*

Be it known that I, GEORGE T. CHAPMAN, a citizen of the United States, residing at White Plains, in the county of Westchester and State of New York, have invented certain new and useful Improvements in Hoof-Toe Contractors and Side-Expanders; and I do hereby declare the following to be a full, clear, and exact description of the invention, such as will enable others skilled in the art to which it appertains to make and use the same.

My invention consists of a toe-contracting and side-expanding device for correcting deformities in horses' hoofs, said device comprising toggle-jointed struts to be attached to the bottom of the hoof back of the toe, with a tension-rod extending forward to a toe-cap and an adjusting-nut so applied to the toe that compression is produced thereon and expansion is produced on the sides and heel, by which the hoof is restored to the proper shape during a short period of treatment, all as hereinafter fully described, reference being made to the accompanying drawings, in which—

Figure 1:
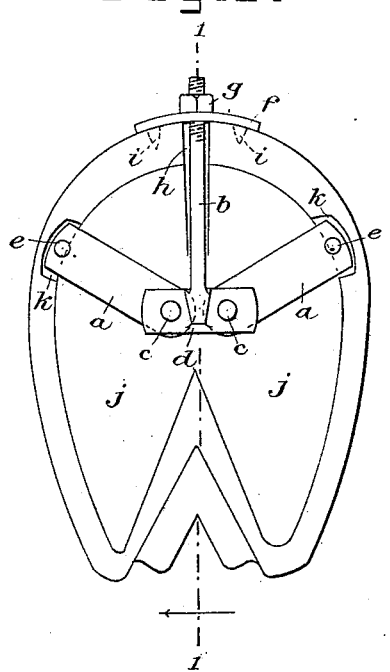
Figure 2:
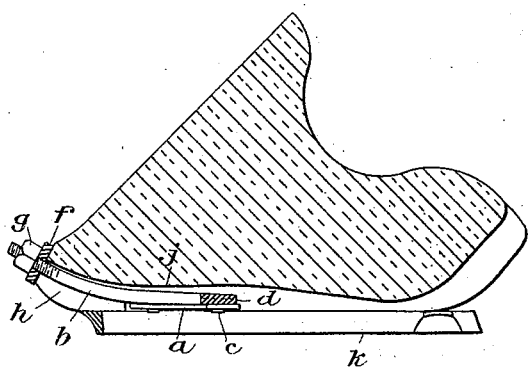

Figure 1 is a plan view of a deformed foot inverted, with the contractor applied as in use; and Fig. 2 is a sectional elevation of Fig. 1 on line 1 1, and it also shows the device as used on a shod foot.

The struts $a$ for expanding the sides of the foot and holding the tension-rod $b$ are pivoted at $c$ to a head-piece $d$, to which the inner end of the tension-rod is attached rigidly, and near the outer ends said struts are perforated at $e$ for nailing, when desired, to the hoof a suitable distance back of the toe, as shown in Fig. 1. The tension-rod extends forward a suitable distance beyond the toe, passing through the toe-cap $f$, and having a nut $g$, to produce compression on the toe by screwing up against the cap, which, being placed on the front surface of the toe, forces the same backward and at the same time causes the expansion-struts to force the sides of the hoof outward. The toe is notched at $h$ to allow the tension-rod to have a position sufficiently higher than the bottom of the hoof for the toe-cap to be seated fairly on the hoof above said bottom, and the cap has spurs $i$, to enter the hoof slightly and prevent it from shifting laterally. When the outer ends of the struts $a$ are attached to the bottom of the hoof, the hoof is notched or recessed, as indicated at $k$, to let the struts in flush with the surface, or a little deeper, so as not to interfere with the tread of the hoof on the ground. The rest of the struts, the head-piece, and the rear portion of the tension-rod occupy space under the sole $j$ of the foot, but above the level of the tread of the hoof, so that they do not interfere with the ordinary use of the foot.

The attachment will generally be used on the bare foot, as I have shown it in Fig. 1; but it will be seen that it does not materially interfere with the application of a shoe $k$, if desired, as in Fig. 2, and I employ it in either case, as circumstances may require. The head $d$ of the tension-rod is made integral with the rod; but, if desired, it may be made separately and attached.

When the device is used with a shoe, it is not essential to make the perforations at $e$ for nailing the struts to the hoof, because the ends of the struts will be retained by the shoe, and they will have their expansive effect by bearing at their ends against the walls of the recesses made in the hoof to receive said ends above the shoe.

It is not essential in all cases to provide the spurs to the toe-cap, for if proper care is taken to keep the nut screwed up the cap will keep its place without the spurs, and I do not limit myself to them.

What I claim, and desire to secure by Letters Patent, is—

1. The combination of the tension-rod, expansion-struts pivoted to the head of said rod, toe-cap, and the adjusting-nut, substantially as described.

2. The combination of the tension-rod, expansion-struts pivoted to the head of said rod, toe-cap, and spurs, and the adjusting-nut, substantially as described.

In testimony whereof I affix my signature in presence of two witnesses.

GEO. T. CHAPMAN.

Witnesses:
W. J. MORGAN,
A. P. THAYER.